United States Patent [19]

Wisner

[11] Patent Number: 4,896,413

[45] Date of Patent: Jan. 30, 1990

[54] METHOD OF REMOVING A COAL MILL ROLL BEARING RACE

[76] Inventor: Charles M. Wisner, 4407 Cogbill Rd., Richmond, Va. 23234

[21] Appl. No.: 248,938

[22] Filed: Sep. 26, 1988

Related U.S. Application Data

[62] Division of Ser. No. 929,772, Nov. 13, 1986, Pat. No. 4,807,346.

[51] Int. Cl.[4] .................. B23P 19/00

[52] U.S. Cl. .................. 29/426.5; 29/282

[58] Field of Search .................. 29/426.5, 266, 402.03, 29/256, 258, 261

[56] References Cited

U.S. PATENT DOCUMENTS

| | | | |
|---|---|---|---|
| 1,492,877 | 5/1924 | Davis | 29/266 |
| 1,705,789 | 3/1929 | Steirly | 29/266 |
| 2,098,134 | 11/1937 | Cook et al. | 29/258 UX |
| 2,568,998 | 9/1951 | Fletcher | 29/266 |
| 2,971,254 | 2/1961 | Fairfield | 29/261 |
| 4,057,889 | 11/1977 | Ferguson | 29/266 |

*Primary Examiner*—Charlie T. Moon
*Attorney, Agent, or Firm*—Cushman, Darby & Cushman

[57] ABSTRACT

A Coal Mill Roll bearing race puller for removing a bearing race from the lower journal housing of a coal mill and a method of removing a roll bearing race are disclosed. The bearing race puller includes a puller base which is receivable within a lower journal housing of a coal mill below a bearing race to be removed and at least one puller segment that is operatively coupled to the puller base so as to extend beyond an outer peripheral edge of the puller base member and under a circumferential lower edge of the race. According to the preferred method of the present invention, a hydraulic jack is fixedly coupled to the puller base member and is used to push/lift the puller base member and attached puller segment(s) out of the lower journal housing and to thereby push/lift the race out of the lower journal housing.

6 Claims, 3 Drawing Sheets

METHOD OF REMOVING A COAL MILL ROLL BEARING RACE

This is a division of application Ser. No. 929,772, filed Nov. 13, 1986, now U.S. Pat. No. 4,807,346.

FIELD OF THE INVENTION

This invention relates to the removal of lower Coal Mill Roll bearing races and, more particularly, to a puller for removing roll bearing races.

BACKGROUND OF THE INVENTION

Prior to the development of the bearing race puller of the present invention, the procedure used to remove the lower race from a journal bearing housing of a coal mill was time consuming, costly, and difficult. That procedure began with the journal bearing being removed from the journal bearing housing. Welders would then heat up the bearing race in an attempt to shrink the race through a cooling effect. Two threaded bars (approximately 12 inches in length) would then be welded to opposite sides of the inner surface of the race. These threaded bars would have to be located visually. The threaded bars would then be placed through a strong back puller; nuts would be applied to each threaded bar, above the puller; and, the nuts would be tightened simultaneously. This tightening action would pull the threaded bars with the attached race in an upward direction. Frequently, force would not be evenly applied to the race causing it to become tilted and jammed when attempted to be pulled out. When this happened, the race would have to cut in half in order to remove it. Cutting the race in this manner would frequently result in cutting of the lower journal housing.

The first three steps of the aforementioned procedure would take three people approximately three to four hours to perform. The fourth step could take several more hours, in addition to the fact that the lower journal housing was often damaged.

It would be therefore desirable to have an apparatus and method that can be used to remove the lower bearing race from a journal bearing housing in a short period of time, is reliable, will not damage the journal housing, and can be used by merely one person rather than three or more.

SUMMARY OF THE INVENTION

The present invention overcomes the aforementioned problems of the earlier described procedure used to remove races from journal bearing housings and has allowed an entirely new procedure to be developed. More particularly, the apparatus and method of the present invention enable the rapid and reliable removal of lower bearing races from journal housings. The disclosed race puller and method involve removing the journal bearing from the journal bearing housing, inserting a puller base into the bottom of the lower journal housing, coupling the puller segments of the race puller to the puller base by inserting dowels to maintain alignment and inserting cap screws so that the puller segments extend under the race to be removed, tightened the cap screws, coupling a hydraulic jack to the puller base, and pushing/lifting the assembled race puller with the race resting thereon out of the journal housing using the jack. This procedure normally takes only one mechanic about five to ten minutes.

Other objects, features, and characteristics of the present invention, as well as the methods of operation and functions of the related elements of the structure, and the combination of parts and economics of manufacture, will become more apparent upon consideration of the following description and the appended claims with reference to the accompanying drawing, all of which form a part of this specification, wherein like reference numerals designate corresponding parts in the various Figures.

DETAILED DESCRIPTION OF THE PRESENTLY PREFERRED EXEMPLARY EMBODIMENT OF THE PRESENT INVENTION

Figure 1:
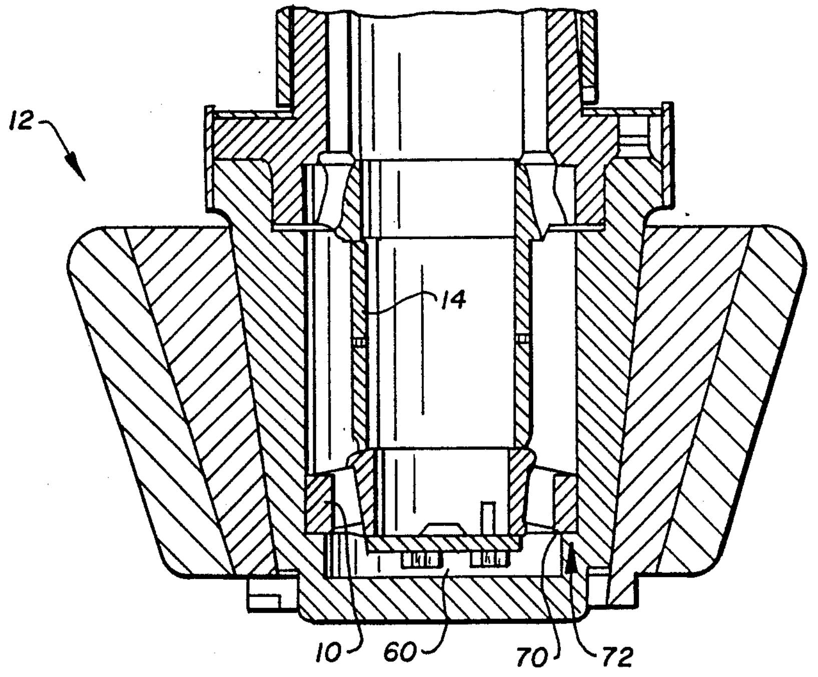
FIG. 1 is a side elevation view, partly in cross section showing the lower bearing race positioned within the journal assembly of a coal mill.

Referring now to the drawings, FIG. 1 shows where the race 10 which may be removed by the apparatus and method of the present invention is located within the journal housing 12 of a coal mill.

Figure 2:
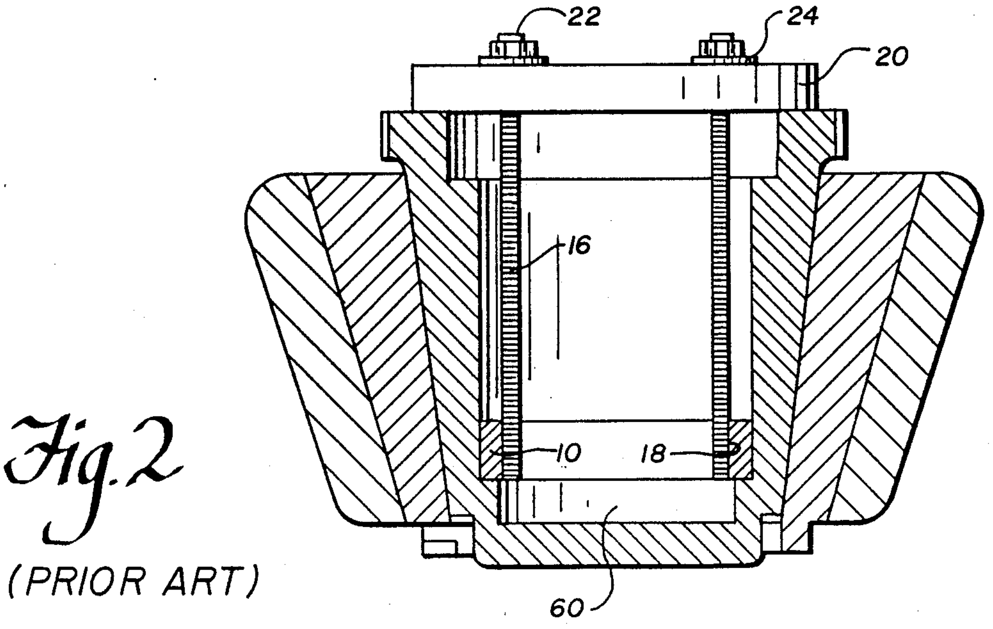
Fig. 2 (PRIOR ART)
FIG. 2 is a side elevation view, partly in cross section illustrating the prior art apparatus for removing a bearing race.

Referring now to FIG. 2, the prior art apparatus for removing the race 10 from the journal housing 12 is illustrated. After the journal bearing 14 (shown in FIG. 1) is removed from the journal housing 12, welders would heat up the race 10 in an attempt to shrink the race 10 through a cooling effect. Welders would then weld two threaded bars 16 to the inner surface 18 of the race 10 at opposite sides thereof. The bars 16 so provided were located on the inner surface 18 of the race 10 visually. Mechanics would then put the threaded bars 16 through a strong back puller 20. Nuts 22 and washers 24 were then applied to each threaded bar 16 above the puller 20. The nuts 22 were then simultaneously tightened. This tightening action would pull the threaded bars 16 up with the attached race 10. Often, the race 10 would become tilted and jammed while being pulled out by the threaded bars 16. When this occurred it was necessary to cut the race 10 in order to remove it from the journal housing 12. Cutting the race 10 would often result in the undesirable cutting of the journal housing 12.

Figure 3:
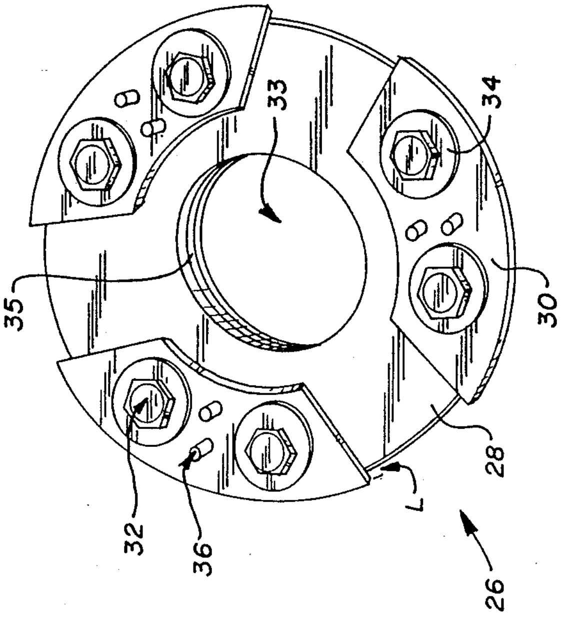
FIG. 3 is a perspective view of a first embodiment of the bearing race puller of the present invention.

A first embodiment of the bearing race puller of the present invention is shown in FIG. 3. In this embodiment, bearing race puller 26 includes a puller base 28 and at least two puller segments 30 affixed to the upper surface of the puller base 28. In the illustrated embodiment, three puller segments 30 are provided on the puller base 28 though it will be understood that a different arrangement or number of puller segments 30 may be provided so long as they extend beyond the outer peripheral edge of the puller base 28 at symmetrically spaced portions thereof as will hereinafter become apparent. Each of the puller segments 30 is attached to the puller base 28 with appropriate washers 34 and cap screws 32. The cap screws 32 are placed through appropriate apertures (not shown) in each of the puller segments 30 and in the puller base 28. In addition, dowels 36 are preferably provided through suitable apertures (not shown) in each of the puller segments 30 and the puller base 28 in order to maintain alignment of each of the puller segments 30 with the puller base 28.

As can be further seen in FIG. 3, the puller base 28 defines an aperture 33 at the center thereof for coupling the puller base 28 to a pushing/lifting means, as will be described below. Preferably, the puller base 28 includes screw threads 35 about the walls of the aperture 33 to provide a means of attaching the puller base 28 to the pushing/lifting means. As can also be seen in FIG. 3, each of the puller segments 30 are preferably arc shaped so that, when attached to the puller base 28, they extend a distance "L" beyond the outer peripheral edge of the puller base 28 at symmetrical portions thereof, as will be hereinafter described. While in the illustrated embodiment the puller base 28 is circular, it is to be understood that the puller base 28 may be any size or shape that will fit within the journal housing 12, below the race 10. Similarly, the puller segments 30 may be any shape so long as they extend a distance "L" beyond the outer peripheral edge of the puller base 28, as will be described below.

Figure 4:
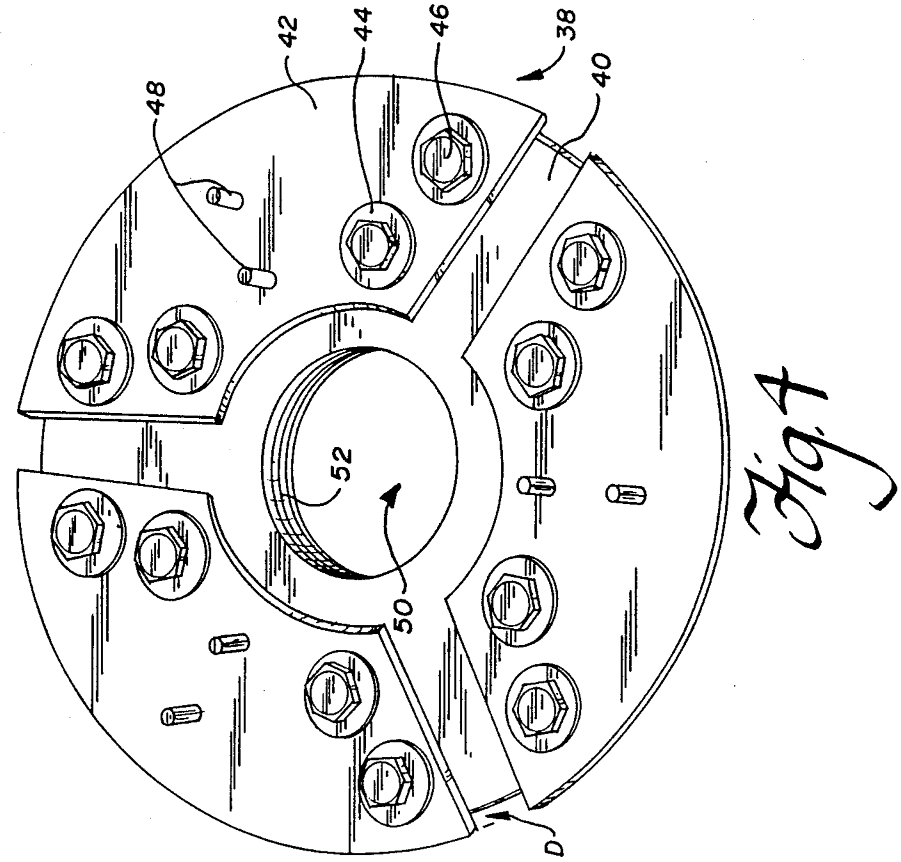
FIG. 4 is a perspective view of a second embodiment of the bearing race puller of the present invention.

Turning now to FIG. 4, a second embodiment of the bearing race puller of the present invention is shown. In this embodiment, the bearing race puller 38 includes a puller base 40 and at least two puller segments 42. In the illustrated embodiment, there are three puller segments 42 though it will be understood that a different number or arrangement of puller segments 42 may be provided so long as they extend beyond the outer periphery of the puller base 40 at symmetrically spaced portions thereof. The puller segments 42 are mounted on the puller base 40 with appropriate washers 44 and cap screws 46. The cap screws 46 are inserted through apertures 66 and 64 provided in the puller segments 42 and the puller base 40, respectively. In addition, dowels 48 are preferably provided through suitable apertures 68 and 62 in each of the puller segments 42 and the puller base 40 so as to align puller segments 42 with the puller base 40.

As can be further seen in FIG. 4, the puller base 40 defines an aperture 50 at the center thereof. In the second embodiment as in the first embodiment, the walls of the aperture 50 are preferable provided with screw threads 52 for coupling the puller base 40 to a pushing-/lifting means as will be described below. In addition, it can be seen that puller segments 42 are preferably arc shaped and, when coupled to the puller base 40 extend a distance "D" beyond the outer peripheral edge of the puller base 40 as will be hereinafter described. While in the illustrated embodiment the puller base 38 is circular, it is to be understood that the puller base 28 may be any size or shape that will fit within the journal housing 12, below the race 10.

Figure 5:
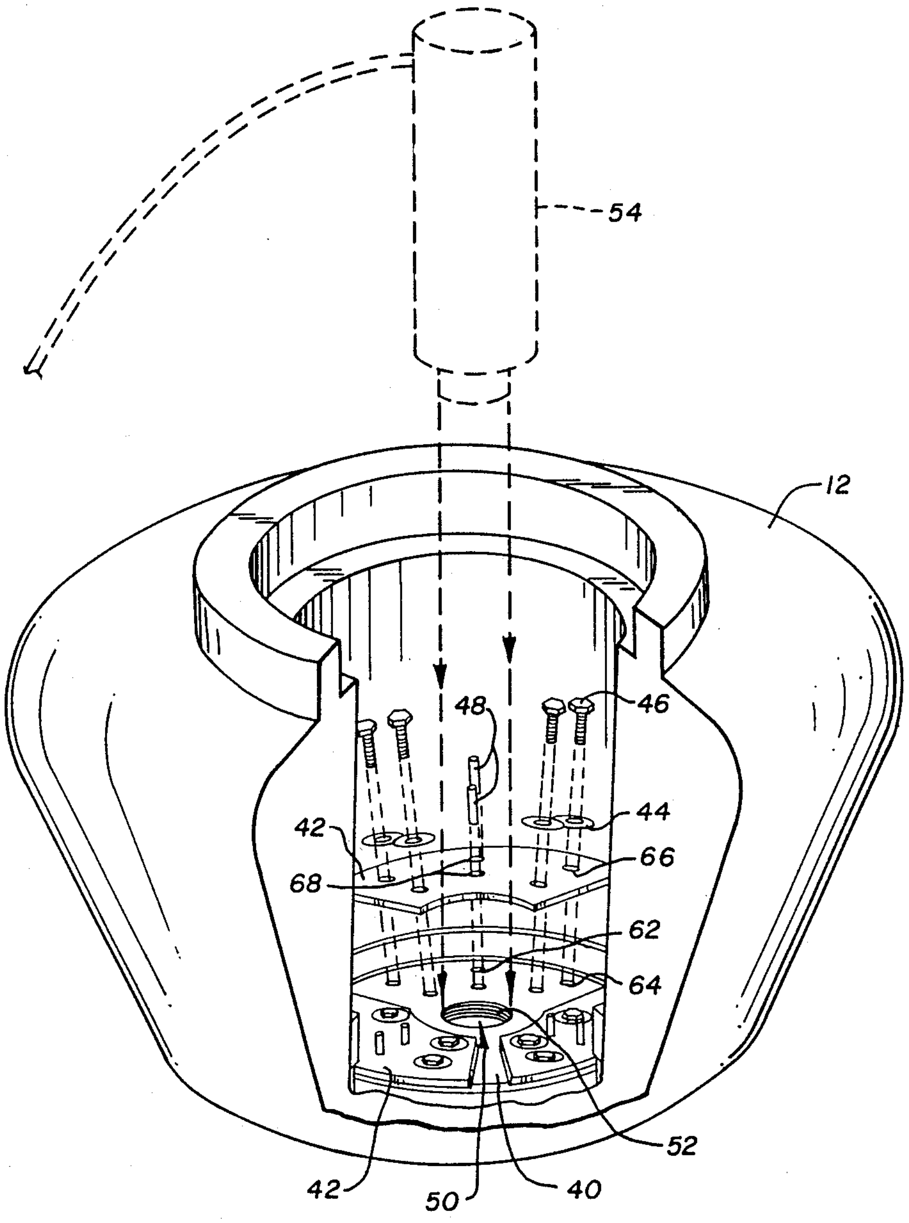
FIG. 5 is an exploded perspective view, partly broken away for clarity, showing the manner in which the bearing race puller of the second embodiment is placed within the journal housing.

The method of removing the bearing race from the journal bearing housing in accordance with the present invention will now be described with reference to FIGS. 1, 4 and 5. After the journal bearing 14 is removed from the journal housing 12, the puller base 40 is placed on the bottom 60 of the lower journal housing 12. As can be seen in FIG. 1, the lower end of journal housing 12 includes a ledge 70 on which the race 10 is placed. As can be further seen, the lower edge 72 of the race 10 extends radially inwardly from the ledge 70. After the puller base 40 is in place, the puller segments 42 are coupled to the puller base 40 by inserting the dowels 48 into their respective apertures 68 and 62 and by inserting the cap screws 46 through their respective washers 44 and into their respective apertures 66 and 64. After the cap screws 46 have been tightened, the bearing race puller is in its assembled condition as shown in FIG. 4. When the bearing race puller 38 is so assembled, the puller segments 42 extend beyond the outer circumference of the puller base 40 a distance "D". This distance "D" should be of a sufficient radial length so that the puller segments 42 will symmetrically extend under at least a portion of the circumferential underside 72 of the portion of the race 10 which extends inwardly from the ledge 70. The particular dimensions of the puller base 40, the puller segments 42, and the distance "D" which the puller segments 42 extend over the top edge of the puller base 40 are determined for each mill, i.e. for each race and housing in which they are to be used. Similarly, the particular dimensions of the puller base 28, puller segments 30, and the distance "L" of the embodiment illustrated in FIG. 3 are determined for the particular race to be removed and the journal housing of the coal mill in which the race is located.

After the bearing race puller 38 has been assembled in the lower journal housing as described above, a means for applying a pushing/lifting force, such as, for example, a hydraulic jack 54 (shown in phantom lines in FIG. 5) is coupled to the puller base 40. In the illustrated embodiment, the puller base 40 defines a centrally disposed apertures 50 which includes screw threads 52 thereabout. Accordingly, a hydraulic jack 54, for example, may be screwed into the aperture 50 of the puller base 40. The hydraulic jack 54 is then operated so as to press against the bottom of the journal housing. The force applied by the jack to the bottom of the journal housing pushes the jack housing and the attached puller base in an upward direction. As is apparent from the above discussion, the puller segments 42 of the puller 38 will make contact with symmetrical portions of the race 10 around the underside 64 thereof as the assembled race puller 38 is raised by the hydraulic jack 54. This symmetric contact assures the application of upward force symmetrically on the race 10 as the puller 38 is lifted out of the journal housing 12 so as to preclude tilting and jamming of the race 10 within the lower journal housing 12. The entire procedure disclosed above normally takes on mechanic five to ten minutes.

While the invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of removing a bearing race from the lower journal housing of a coal mill comprising:

removing a journal bearing from a journal housing;

inserting a main body member, having first and second longitudinal ends and a cross-section having a maximum diameter less than an internal diameter of race to be removed, into the lower journal housing so that said main body member is disposed below a bearing race to be removed and said first and second longitudinal ends are parallel with a base of the lower journal housing;

fixedly mounting at least first and second plate elements to said main body member so that an edge of each of said plate elements extends beyond a peripheral edge of said main body member so as to define an assembled structure of symmetrical configuration, having a maximum cross-sectional dimension greater than an inner diameter of a race to be removed, and having a central aperture defined at least partially therethrough, the walls of said central aperture having coupling means defined thereon;

coupling removing means to said coupling means defined in said central aperture of said assembled structure, said removing means including means for moving said assembled structure relative to said journal housing so as to lift said assembled structure from below the race to be removed and so that the plate elements engage and lift the race from the cylindrical bore of the housing; and actuating said removing means to remove said bearing race from said housing.

2. A method as in claim 1, wherein said step of fixedly mounting comprises fixedly mounting at least two plate elements to an upper surface of said main body member.

3. A method as in claim 2, wherein said step of fixedly mounting comprises fixedly mounting with bolt means.

4. A method as in claim 1, further including aligning each said plate element with said main body member with dowel means.

5. A method as in claim 4, wherein said step of aligning comprises inserting dowel means through apertures defined in said plate elements and corresponding apertures defined in said main body member so as to align said plate elements with said main body member.

6. A method as in claim 1, wherein said step of fixedly mounting comprises fixedly mounting at least three plate elements to said main body member.

* * * * *